US009438111B2

(12) United States Patent
Li

(10) Patent No.: US 9,438,111 B2
(45) Date of Patent: Sep. 6, 2016

(54) CIRCUIT AND METHOD FOR REDUCING INDUCTOR MAGNETIC-CORE LOSS

(71) Applicant: Shenzhen China Star Optoelectronics Technology Co., Ltd., Shenzhen, Guangdong (CN)

(72) Inventor: Fei Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 216 days.

(21) Appl. No.: 14/373,344

(22) PCT Filed: Apr. 1, 2014

(86) PCT No.: PCT/CN2014/074510
§ 371 (c)(1),
(2) Date: Jul. 18, 2014

(87) PCT Pub. No.: WO2015/135232
PCT Pub. Date: Sep. 17, 2015

(65) Prior Publication Data

US 2015/0280542 A1 Oct. 1, 2015

(30) Foreign Application Priority Data

Mar. 13, 2014 (CN) .......................... 2014 1 0092251

(51) Int. Cl.
*G05F 1/00* (2006.01)
*H02M 3/156* (2006.01)
*H02M 1/00* (2006.01)

(52) U.S. Cl.
CPC ..... *H02M 3/156* (2013.01); *H02M 2001/0048* (2013.01); *Y02B 70/1491* (2013.01)

(58) Field of Classification Search
CPC .................... H02M 3/156; H02M 2001/0048; H02M 1/00; H02M 5/293; Y02B 70/1491
USPC ................................................. 323/288, 222
See application file for complete search history.

(56) References Cited

U.S. PATENT DOCUMENTS

2004/0189408 A1* 9/2004 Lum Shue Chan ...... G06F 1/04 331/74
2011/0074445 A1* 3/2011 Nascimento ............ G01D 5/24 324/676
2012/0229113 A1* 9/2012 Houston ............ H02M 3/1588 323/288
2014/0159686 A1* 6/2014 Lee ...................... H02M 3/156 323/282

* cited by examiner

*Primary Examiner* — Jessica Han
*Assistant Examiner* — Lorena Bruner
(74) *Attorney, Agent, or Firm* — Andrew C. Cheng

(57) ABSTRACT

A circuit for reducing inductor magnetic-core loss is disclosed. The circuit includes a switch transistor, a PWM signal source connecting to the switch transistor, an inductor connecting to the switch transistor, a load connecting to the switch transistor, and a frequency adjustment circuit. The frequency adjustment circuit obtains PWM signals from the PWM signal source and modulates the PWM signals to be a new square-wave signals to be outputted to the switch transistor. The switch transistor is configured for setting the frequency of the square-wave signals as the operation frequency so as to control a duration for which the current flowing through the inductor. The operation frequency of the switch transistor may be adjusted by modulating the frequency of the PWM signals. As such, the duration for which the current flowing through the inductor may be controlled so as to decrease the current amount flowing through the inductor.

8 Claims, 3 Drawing Sheets

Frequency adjustment circuit
PWM signal source
RC wave-filter
Level detection module
Frequency adjustment module
Frequency output module
Load
S
G
Switch transistor
D
Inductor

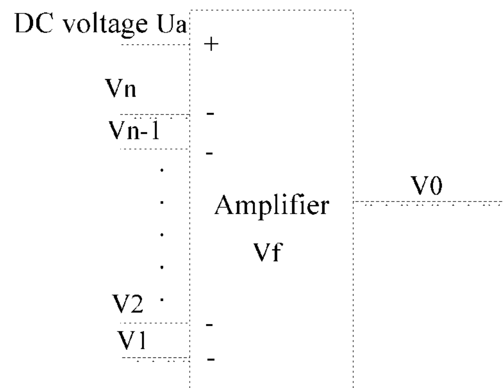

Figure 6

Receiving PWM signals sent from a PWM signal source, and modulating the obtained PWM signals to obtain a new square-wave signals to be outputted to the switch transistor, a duty-cycle ratio of the modulated square-wave signals is the same with the duty-cycle ratio of the PWM signals, and a frequency of the modulated square-wave signals is higher than the frequency of the PWM signals

S101

Obtaining the square-wave signals outputted from the switch transistor, and setting the frequency of the obtained square-wave signals as an operating frequency so as to control the duration for which a current flowing through an inductor

CIRCUIT AND METHOD FOR REDUCING INDUCTOR MAGNETIC-CORE LOSS

BACKGROUND OF THE INVENTION

This application claims priority to China Patent Application No. 201410092251.7 filed on Mar. 13, 2014 entitled, CIRCUIT AND METHOD FOR REDUCING INDUCTOR MAGNETIC-CORE LOSS, all of the disclosures of which are incorporated herein by reference in their entirety.

1. Field of Invention

Embodiments of the present disclosure relate to electronic technology, and more particularly to a circuit and method for reducing inductor magnetic-core loss.

2. Discussion of the Related Art

As shown in FIG. 1, when the light-emitting diode (LED) is driven, generally, the lights are adjusted by changing the duty-cycle ratio of the low frequency, i.e., 100-240 HZ, pulse width modulation (PWM) signals. The operation frequency of the switch transistor (Q1) remains the same regardless whether the duty-cycle ratio of the PWM signals has been adjusted. Thus, the current of the inductor (L1) also remains the same, which results in the inductor magnetic-core loss due to an increased temperature for the conditions such as charging the pull-down regulator, performing the full-power testing, performing the temperature testing at the inductor ends, and so on. When the temperature increases, the inductor magnetic-core loss accumulates, and thus the inductor may be burnt.

SUMMARY

The object of the claimed invention is to provide a circuit and a method for reducing inductor magnetic-core loss. The operation frequency of the switch transistor may be adjusted by modulating the frequency of the PWM signals. As such, the duration for which the current flowing through the inductor may be controlled so as to decrease the current amount flowing through the inductor.

In one aspect, a circuit for reducing inductor magnetic-core loss includes: a switch transistor, a PWM signal source connecting to a gate of the switch transistor, an inductor connecting to a drain of the switch transistor, a load connecting to a source of the switch transistor, and a frequency adjustment circuit; the frequency adjustment circuit being arranged between the PWM signal source and the switch transistor, an input end of frequency adjustment circuit connects to the PWM signal source, and an output end of the frequency adjustment circuit connects to a gate of the switch transistor so as to obtain PWM signals from the PWM signal source, the frequency adjustment circuit modulates the obtained PWM signals to generate a new square-wave signals, and then the modulated square-wave signal is outputted to the switch transistor, wherein a duty-cycle ratio of the modulated square-wave signals is the same with the duty-cycle ratio of the PWM signals, and the frequency of the modulated square-wave signals is higher than the frequency of the PWM signals; and the switch transistor being configured for obtaining the outputted square-wave signals, and for setting the frequency of the square-wave signals as the operation frequency so as to control a duration for which the current flowing through the inductor.

Wherein the frequency adjustment circuit includes a RC wave-filter processor, a level detection module, a frequency adjustment module and a frequency output module, wherein: the input end of the RC wave-filter processor connects to the PWM signal source to obtain the PWM signals sent from the PWM signal source, the RC wave-filter processor performs a RC wave-filter process for the PWM signals to obtain direct current (DC) voltage signals; the level detection module includes an amplifier for comparing the DC voltage of the DC voltage signals with one or more predetermined voltage to obtain a comparing voltage corresponding to the DC voltage signals, the comparing voltage is amplified by the amplifier to obtain an amplified voltage corresponding to the DC voltage signals, and wherein the input end of the amplifier connects to the output end of the RC wave-filter processor; the frequency adjustment module includes a voltage-control oscillator and a triangle-wave generator, the input end of the voltage-control oscillator connects to the output end of the amplifier such that the obtained amplified voltage passes through the voltage-control oscillator to generate an oscillated voltage signals, the input end of the triangle-wave generator connects to the output end of the voltage-control oscillator such that the generated oscillated voltage signals is modulated by the triangle-wave generator to obtain a triangle-wave signals; and the frequency output module includes a comparator for comparing the triangle-wave signals with the predetermined reference voltage so as to obtain a new square-wave signals to be outputted to the switch transistor, the duty-cycle ratio of the square-wave signals is the same with the duty-cycle ratio of the PWM signals, the input end of the comparator connects to the output end of the triangle-wave generator, and the output end of the comparator connects to the gate of the switch transistor.

Wherein the output end of the amplifier includes a positive end and a plurality of negative ends, the positive end of the amplifier connects to the output end of the RC wave-filter processor, and the negative ends of the amplifier connects to one or more predetermined voltage output ends within the level detection module.

Wherein the predetermined voltage on the negative ends of the amplifier are arranged in an increased order according to serial numbers, and a gap between the predetermined voltages are the same.

Wherein the predetermined reference voltage of the input end of the comparator is the output voltage generated by a three-end regulator.

Wherein the frequency output module further includes a wave pull-up device, the input end of the wave pull-up device connects to the output end of the comparator, and the output end of the wave pull-up device connects to the gate of the switch transistor for pulling up the square-wave signals outputted from the comparator of the frequency output module, and the pulled-up square-wave signals is outputted to the switch transistor.

In another aspect, a circuit for reducing inductor magnetic-core loss includes: a switch transistor, a PWM signal source connecting to a gate of the switch transistor, an inductor connecting to a drain of the switch transistor, a load connecting to a source of the switch transistor, a RC wave-filter processor, a level detection module, a frequency adjustment module and a frequency output module, wherein: the input end of the RC wave-filter processor connects to the PWM signal source to obtain the PWM signals sent from the PWM signal source, the RC wave-filter processor performs a RC wave-filter process for the PWM signals to obtain direct current (DC) voltage signals; the level detection module includes an amplifier for comparing the DC voltage of the DC voltage signals with one or more predetermined voltage to obtain a comparing voltage corresponding to the DC voltage signals, the comparing voltage is amplified by the amplifier to obtain an amplified voltage corresponding to the DC voltage signals, and wherein the input end of the amplifier connects to the output end of the RC wave-filter processor; the frequency adjustment module includes a voltage-control oscillator and a triangle-wave generator, the input end of the voltage-control oscillator connects to the output end of the amplifier such that the obtained amplified voltage passes through the voltage-control oscillator to generate an oscillated voltage signals, the input end of the triangle-wave generator connects to the output end of the voltage-control oscillator such that the generated oscillated voltage signals is modulated by the triangle-wave generator to obtain a triangle-wave signals; and the frequency output module includes a comparator for comparing the triangle-wave signals with the predetermined reference voltage so as to obtain a new square-wave signals to be outputted to the switch transistor, the duty-cycle ratio of the square-wave signals is the same with the duty-cycle ratio of the PWM signals, the input end of the comparator connects to the output end of the triangle-wave generator, and the output end of the comparator connects to the gate of the switch transistor; and the switch transistor being configured for obtaining the outputted square-wave signals, and for setting the frequency of the square-wave signals as the operation frequency so as to control a duration for which the current flowing through the inductor.

Wherein the output end of the amplifier includes a positive end and a plurality of negative ends, the positive end of the amplifier connects to the output end of the RC wave-filter processor, and the negative ends of the amplifier connects to one or more predetermined voltage output ends within the level detection module.

Wherein the predetermined voltage on the negative ends of the amplifier are arranged in an increased order according to serial numbers, and a gap between the predetermined voltages are the same.

Wherein the predetermined reference voltage of the input end of the comparator is the output voltage generated by a three-end regulator.

Wherein the frequency output module further includes a wave pull-up device, the input end of the wave pull-up device connects to the output end of the comparator, and the output end of the wave pull-up device connects to the gate of the switch transistor for pulling up the square-wave signals outputted from the comparator of the frequency output module, and the pulled-up square-wave signals is outputted to the switch transistor.

In another aspect, a method for reducing inductor magnetic-core loss includes: receiving PWM signals sent from a PWM signal source, and modulating the obtained PWM signals to obtain a new square-wave signals to be outputted to the switch transistor, a duty-cycle ratio of the modulated square-wave signals is the same with the duty-cycle ratio of the PWM signals, and a frequency of the modulated square-wave signals is higher than the frequency of the PWM signals; and obtaining the square-wave signals outputted from the switch transistor, and setting the frequency of the obtained square-wave signals as an operation frequency so as to control the duration for which a current flowing through an inductor.

Wherein the receiving step further includes: (a) obtaining the PWM signals sent from the PWM signal source, and applying a RC wave-filter process to the PWM signals to obtain a DC voltage signals; (b) comparing a DC voltage of the DC voltage signals with one or more predetermined voltage to obtain a comparing voltage corresponding to the DC voltage signals, and amplifying the comparing voltage to obtain an amplified voltage corresponding to the DC voltage signals; (c) modulating the amplified voltage to be an oscillated voltage signals, and further modulating the oscillated voltage signals to obtain a triangle-wave signals; and (d) comparing the obtained triangle-wave signals with the predetermined reference voltage to obtain the new square-wave signals to be outputted to the switch transistor.

Wherein the step (b) further includes: when the DC voltage is between two adjacent predetermined voltages, the one predetermined voltage with a larger value is selected as the operation voltage, a difference between the operation voltage and the DC voltage is calculated to be the comparing voltage corresponding to the DC voltage; and when the DC voltage is greater than or smaller than each of the predetermined voltages, the comparing voltage corresponding to the DC voltage is 0.

Wherein the predetermined voltage on the negative ends of the amplifier are arranged in an increased order according to serial numbers, and a gap between the predetermined voltages are the same.

Wherein step (d) further includes: pulling up the square-wave signal and outputting the pulled square-wave signals to the switch transistor.

Wherein the predetermined reference voltage of the input end of the comparator is the output voltage generated by a three-end regulator.

In view of the above, the obtained PWM signals is modulated to obtain a new square-wave signals, and the output frequency of the square-wave signals is set to be the operation frequency of the switch transistor. In this way, the duration for which the current flowing through the inductor may be controlled so as to decrease the current amount flowing through the inductor.

BRIEF DESCRIPTION OF THE DRAWINGS

FIG. 6 is a schematic view of the amplifier of FIGS. 4 and 5.

FIG. 7 is a flowchart illustrating the method for reducing the inductor magnetic-core loss in accordance with a third embodiment.

DETAILED DESCRIPTION OF THE EMBODIMENTS

Embodiments of the invention will now be described more fully hereinafter with reference to the accompanying drawings, in which embodiments of the invention are shown.

Figure 1:
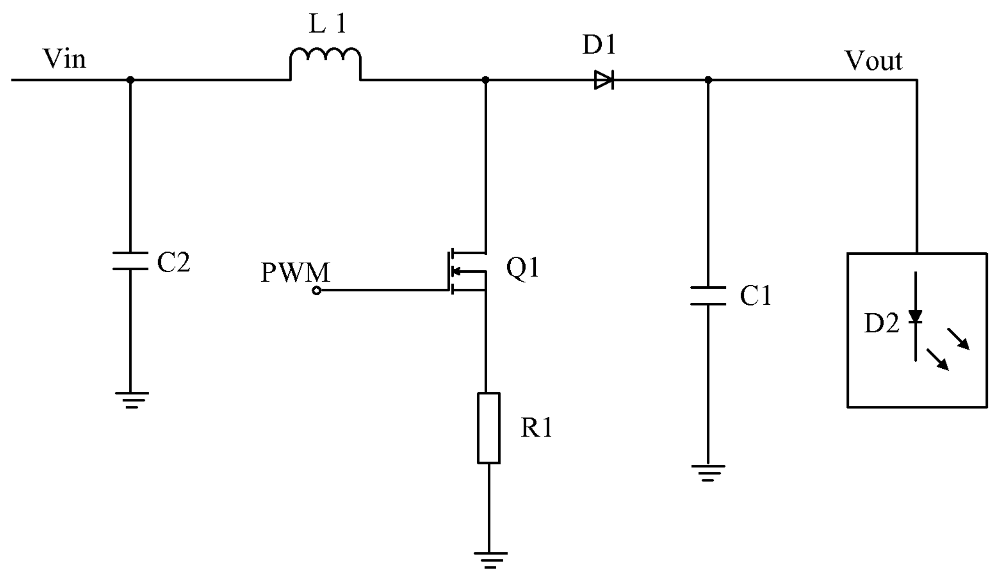
FIG. 1 is a schematic view of one conventional LED backlight driving circuit.

Referring to FIG. 1, it is found that the inductor magnetic-core loss may not be reduced by adopting the conventional method for adjusting the duty-cycle ratio of the PWM signals. This is because the conventional method only changes the lighting duration of the LEDs. In order to reduce the inductor magnetic-core loss, the following formula regarding the inductor is analyzed:

$$L\frac{di}{dt} = U;$$

Wherein L represents the inductance coefficient, which is a constant number, di represents a current changing amount flowing through the inductor, dt represents the duration for which the current flowing through the inductor, U represents an output voltage of the inductor for driving the LEDs, which is a fixed value. In order to reduce the inductor magnetic-core loss, the di has to be reduced, which may be achieved by decreasing the dt. Thus, a switch transistor (Q1) is needed to control the dt (the duration for which the current flowing through the inductor (L1)), which is also the duration for which the switch transistor (Q1) is turn on. The dt is controlled to decrease the current amount (di) flowing through the inductor. As the input voltage (Vin) and the output voltage (Vout) are fixed, the value of the duty-cycle ratio (D) of the switch transistor (Q1) is also fixed according to the formula below:

$$\frac{Vout}{Vin} = \frac{1}{1-D}$$

The duration for which the switch transistor (Q1) is turn on (dt) may be represented by the formula below:

$$dt = \frac{D}{f}$$

Wherein f represents the operation frequency of the switch transistor (Q1). Thus, the operation frequency (f) of the switch transistor (Q1) has to be increased so as to decrease the duration for which the switch transistor (Q1) is turn on (dt). Thus, in order to reduce the inductor magnetic-core loss, the operation frequency of the switch transistor (Q1) has to be increased.

Figure 2:
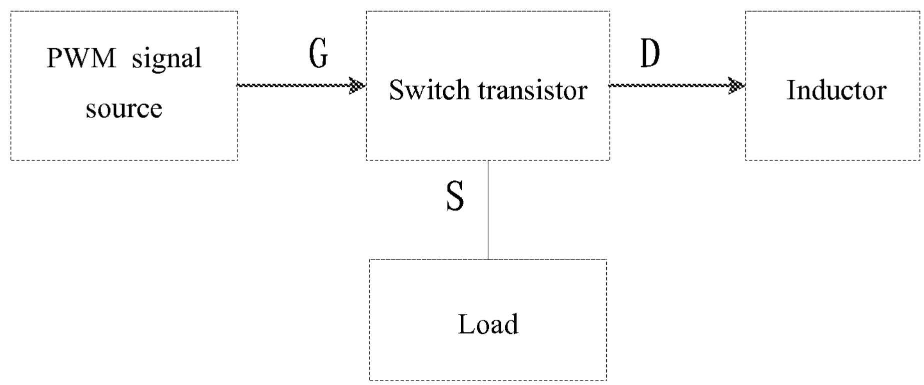
FIG. 2 is a schematic view showing one conventional inductor operation circuit.

In view of the above, a circuit for reducing the inductor magnetic-core loss ("circuit") is provided to improve the inductor operation circuit, as shown in FIG. 2. By adopting the circuit and changing the operation frequency of the switch transistor, the inductor magnetic-core loss is reduced.

Figure 3:
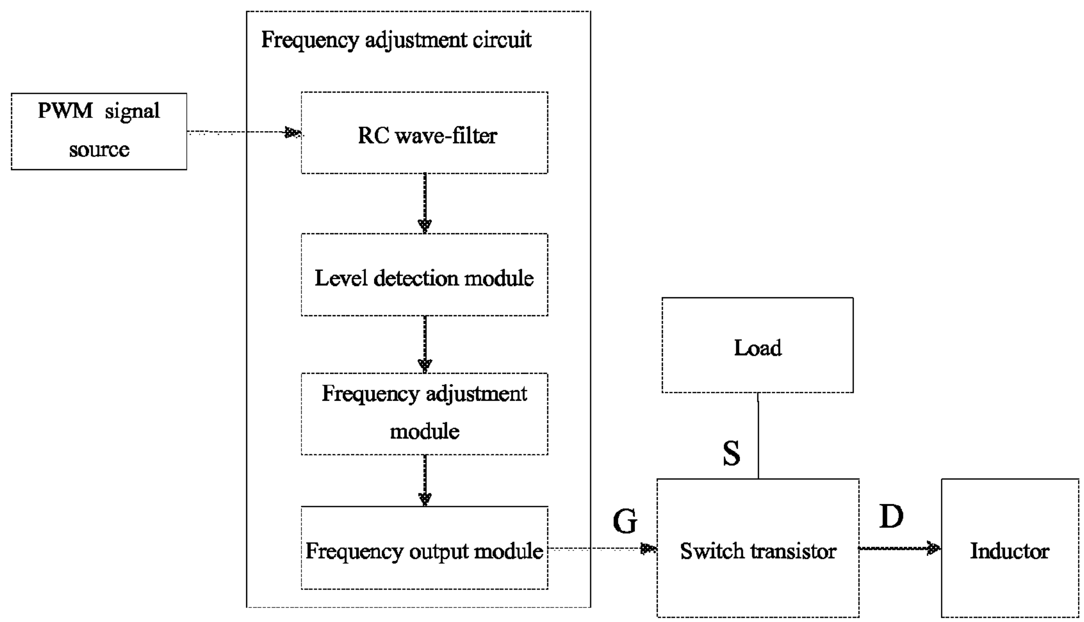
FIG. 3 is a schematic view showing the circuit for reducing inductor magnetic-core loss in accordance with a first and a second embodiment.
Figure 4:
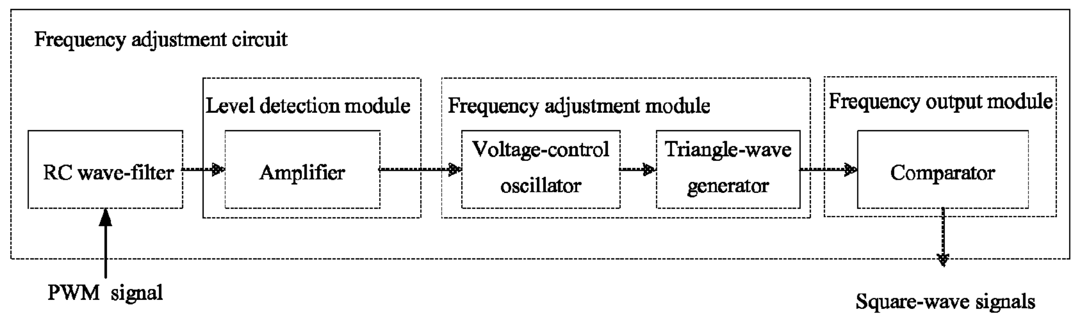
FIG. 4 is a schematic view of the frequency adjustment circuit of FIG. 3.
Figure 5:
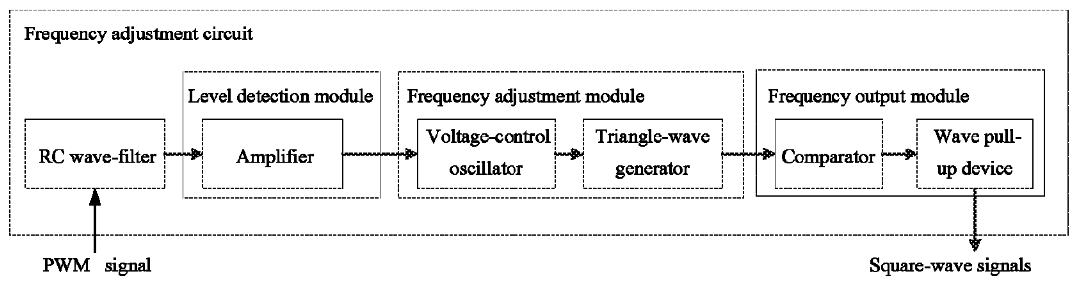
FIG. 5 is another schematic view of the frequency adjustment circuit of FIG. 3.

FIG. 3 is a schematic view showing the circuit for reducing inductor magnetic-core loss in accordance with a first embodiment. The circuit includes the switch transistor, a PWM signal source connecting to the gate (G) of the switch transistor, an inductor connecting to the drain (D) of the switch transistor, a load connecting to the source (S) of the switch transistor, and a frequency adjustment circuit.

The frequency adjustment circuit is arranged between the PWM signal source and the switch transistor. An input end of frequency adjustment circuit connects to the PWM signal source, and an output end of the frequency adjustment circuit connects to the gate (G) of the switch transistor so as to obtain the PWM signals from the PWM signal source. In addition, the output end of the frequency adjustment circuit modulates the obtained PWM signals to generate a new square-wave signals, and then the modulated square-wave signal is outputted to the switch transistor. The duty-cycle ratio of the modulated square-wave signals is the same with that of the PWM signals, but the frequency of the modulated square-wave signals is higher than that of the PWM signals.

The switch transistor is configured for obtaining the outputted square-wave signals, and for setting the frequency of the square-wave signals as the operation frequency so as to control the duration for which the current flowing through the inductor.

In one example, the frequency adjustment circuit includes a RC wave-filter processor, a level detection module, a frequency adjustment module and a frequency output module.

In one embodiment, the RC wave-filter processor is an RC regulator, including, for instance, a resistor and a capacitor serially connected. The input end of the RC wave-filter processor connects to the PWM signal source to obtain the PWM signals sent from the PWM signal source. Also, the RC wave-filter processor performs a RC wave-filter process for the PWM signals to obtain direct current (DC) voltage signals.

The level detection module includes an amplifier for comparing the DC voltage of the DC voltage signals with one or more predetermined voltage to obtain a comparing voltage corresponding to the DC voltage signals. The comparing voltage is amplified by the amplifier to obtain an amplified voltage corresponding to the DC voltage signals. The input end of the amplifier connects to the output end of the RC wave-filter processor.

The frequency adjustment module includes a voltage-control oscillator and a triangle-wave generator. The input end of the voltage-control oscillator connects to the output end of the amplifier such that the obtained amplified voltage passes through the voltage-control oscillator to generate an oscillated voltage signals. The input end of the triangle-wave generator connects to the output end of the voltage-control oscillator such that the generated oscillated voltage signals is modulated by the triangle-wave generator to obtain a triangle-wave signals.

The frequency output module includes a comparator for comparing the triangle-wave signals with the predetermined reference voltage so as to obtain new square-wave signals, which is then outputted to the switch transistor. The duty-cycle ratio of the square-wave signals is the same with that of the PWM signals. The input end of the comparator connects to the output end of the triangle-wave generator, and the output end of the comparator connects to the gate (G) of the switch transistor.

Furthermore, the output end of the amplifier includes a positive end and a plurality of negative ends. The positive end of the amplifier connects to the output end of the RC wave-filter processor, and the negative ends of the amplifier connects to one or more predetermined voltage output ends within the level detection module.

Furthermore, the predetermined voltages on the negative ends of the amplifier are arranged in an increased order according to serial numbers, and the gaps between the predetermined voltages are the same.

Furthermore, the predetermined reference voltage of the input end of the comparator is the output voltage generated by a three-end regulator.

Furthermore, the frequency output module further includes a wave pull-up device. The input end of the wave pull-up device connects to the output end of the comparator, and the output end of the wave pull-up device connects to the gate (G) of the switch transistor for pulling up the square-wave signals outputted from the comparator of the frequency output module. In addition, the pulled-up square-wave signals are outputted to the switch transistor.

The operating principle of the circuit for reducing the inductor magnetic-core loss in the first embodiment will be described in brief hereinafter. The PWM signals sent from the PWM signal source flows through the RC wave-filter processor of the frequency adjustment circuit so as to generate the DC voltage signals. The voltage of the DC voltage signals is compared and amplified by the level detection module to obtain the amplified voltage of the DC voltage, and then the amplified voltage passes through the voltage-control oscillator and the triangle-wave generator of the frequency adjustment module to obtain the triangle-wave signals. The triangle-wave signals passes through the frequency output module to obtain the new square-wave signals for the switch transistor. As the frequency of the square-wave signals is higher than that of the PWM signals, the switch transistor sets the frequency of the obtained square-wave signals as the operation frequency so as to control the duration for which the current flowing through the inductor. In this way, the amount of the current flowing through the inductor is decreased, and the inductor magnetic-core loss is also reduced.

In the second embodiment, the circuit for inductor magnetic-core loss includes the switch transistor, the PWM signal source connecting to the gate (G) of the switch transistor, the inductor connecting to the drain (D) of the switch transistor, the loading connecting to the switch transistor of the switch transistor, the RC wave-filter processor, the level detection module, the frequency adjustment circuit, and the frequency output module.

The input end of the RC wave-filter processor connects to the PWM signal source to obtain the PWM signals sent from the PWM signal source. Also, the RC wave-filter process is applied to the PWM signals to obtain DC voltage signals.

The level detection module includes an amplifier for comparing the DC voltage of the DC voltage signals with one or more predetermined voltage to obtain a comparing voltage corresponding to the DC voltage signals. The comparing voltage is amplified by the amplifier to obtain an amplified voltage corresponding to the DC voltage signals. The input end of the amplifier connects to the output end of the RC wave-filter processor.

The frequency adjustment module includes a voltage-control oscillator and a triangle-wave generator. The input end of the voltage-control oscillator connects to the output end of the amplifier such that the obtained amplified voltage passes through the voltage-control oscillator to generate an oscillated voltage signals. The input end of the triangle-wave generator connects to the output end of the voltage-control oscillator such that the generated oscillated voltage signals is modulated by the triangle-wave generator to obtain a triangle-wave signals.

The frequency output module includes a comparator for comparing the triangle-wave signals with the predetermined reference voltage so as to obtain new square-wave signals, which is then outputted to the switch transistor. The duty-cycle ratio of the square-wave signals is the same with that of the PWM signals. The input end of the comparator connects to the output end of the triangle-wave generator, and the output end of the comparator connects to the gate (G) of the switch transistor.

The switch transistor is configured for obtaining the square-wave signals. The switch transistor sets the frequency of the obtained square-wave signals as the operation frequency so as to control the duration for which the current flowing through the inductor.

Furthermore, the input end of the amplifier includes a positive end and a plurality of negative ends. The positive end of the amplifier connects to the output end of the RC wave-filter processor, and the negative ends of the amplifier connects to one or more predetermined voltage output ends within the level detection module.

Furthermore, the predetermined voltages on the negative ends of the amplifier are arranged in an increased order according to the serial numbers, and the gaps between the predetermined voltages are the same.

Furthermore, the predetermined reference voltage of the input end of the comparator is the output voltage generated by a three-end regulator.

Furthermore, the frequency output module further includes a wave pull-up device. The input end of the wave pull-up device connects to the output end of the comparator, and the output end of the wave pull-up device connects to the gate (G) of the switch transistor for pulling up the square-wave signals outputted from the comparator of the frequency output module. In addition, the pulled-up square-wave signals are outputted to the switch transistor.

In view of the above, it can be understood that the operating principle of the circuit for inductor magnetic-core loss in the second embodiment is similar to that in the first embodiment.

FIG. 7 is a flowchart illustrating the method for reducing the inductor magnetic-core loss in accordance with a third embodiment. The method includes the following steps.

In step S101, the PWM signals sent from the PWM signal source is obtained, and the obtained PWM signals is modulated to obtain a new square-wave signals to be outputted to the switch transistor. The duty-cycle ratio of the modulated square-wave signals is the same with that of the PWM signals, but the frequency of the modulated square-wave signals is higher than that of the PWM signals. The steps will be described in detail hereinafter.

In step (a), the PWM signals sent from the PWM signal source is received. The RC wave-filter process is then applied to the PWM signals to obtain the DC voltage signals.

In step (b), the DC voltage of the DC voltage signals is compared with one or more predetermined voltage to obtain a comparing voltage corresponding to the DC voltage signals. The comparing voltage is amplified to obtain an amplified voltage corresponding to the DC voltage signals.

Specifically, when the DC voltage is between two adjacent predetermined voltages, the one predetermined voltage with a larger value is selected as the operation voltage. The difference between the operation voltage and the DC voltage is then calculated to be the comparing voltage corresponding to the DC voltage. When the DC voltage is greater than or smaller than each of the predetermined voltages, the comparing voltage corresponding to the DC voltage is 0. The predetermined voltages are arranged in an increased order according to the serial numbers, and the gaps between the predetermined voltages are the same.

The obtained comparing voltage is then amplified by a specific ratio to obtain the amplified voltage corresponding to the DC voltage.

Referring to FIG. 6, the predetermined voltages include V1 to Vn, wherein V1 to VN are arranged in the increased order according to the serial numbers, and the gap between two adjacent predetermined voltages are the same. That is, V1<V2< . . . <Vn. The RC wave-filter process is applied to the PWM signals to obtain the DC voltage signals. The DV voltage is Ua, which is compared with the predetermined voltage, including V1 to Vn.

When Ua is between Vi−1 and Vi, Vi is selected as the operation voltage. The difference (Vf)=operation voltage (Vi)−DC voltage (Ua). Afterward, the difference (Vf) is amplified to obtain the amplified voltage (V0) corresponding to the DC voltage (Ua). When the DC voltage (Ua) is greater than or smaller than each of the predetermined voltages, i.e., Ua>Vn or Ua<V1, the amplifying voltage (V0) corresponding to the DC voltage is 0.

In step (c), the amplified voltage is modulated to be the oscillated voltage signals, and the oscillated voltage signals are further modulated to obtain the triangle-wave signals.

In step (d), the obtained triangle-wave signals is compared with the predetermined reference voltage to obtain the new square-wave signals to be outputted to the switch transistor.

The step (d) further includes: pulling up the square-wave signal and then outputting the pulled square-wave signals to the switch transistor.

The predetermined reference voltage is generated by the three-end regulator, and the precision of the voltage is about 0.5%. The frequency of the outputted square-wave signals is higher in response to a larger reference voltage. The duty-cycle ratio of the square-wave signals is the same with that of the PWM signals.

In step S102, the switch transistor obtains the square-wave signals and sets the frequency of the square-wave signals as the operation frequency so as to control the duration for which the current flowing through the inductor.

In view of the above, the PWM signals is modulated to obtain the new square wave, and the frequency of the square-wave signals is set as the operation frequency of the switch transistor so as to control the duration for which the current flowing through the inductor. In this way, the amount of the current flowing through the inductor is decreased, and the inductor magnetic-core loss is also reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A circuit for reducing inductor magnetic-core loss, comprising:

a switch transistor, a PWM signal source connecting to a gate of the switch transistor, an inductor connecting to a drain of the switch transistor, a load connecting to a source of the switch transistor, and a frequency adjustment circuit;

the frequency adjustment circuit being arranged between the PWM signal source and the switch transistor, an input end of frequency adjustment circuit connects to the PWM signal source, and an output end of the frequency adjustment circuit connects to a gate of the switch transistor so as to obtain PWM signals from the PWM signal source, the frequency adjustment circuit modulates the obtained PWM signals to generate a new square-wave signals, and then the modulated square-wave signal is outputted to the switch transistor, wherein a duty-cycle ratio of the modulated square-wave signals is the same with the duty-cycle ratio of the PWM signals, and the frequency of the modulated square-wave signals is higher than the frequency of the PWM signals;

the switch transistor being configured for obtaining the outputted square-wave signals, and for setting the frequency of the square-wave signals as the operation frequency so as to control a duration for which the current flowing through the inductor; and wherein the frequency adjustment circuit comprises a RC wave-filter processor, a level detection module, a frequency adjustment module and a frequency output module, wherein:

the input end of the RC wave-filter processor connects to the PWM signal source to obtain the PWM signals sent from the PWM signal source, the RC wave-filter processor performs a RC wave-filter process for the PWM signals to obtain direct current (DC) voltage signals;

the level detection module comprises an amplifier for comparing the DC voltage of the DC voltage signals with one or more predetermined voltage to obtain a comparing voltage corresponding to the DC voltage signals, the comparing voltage is amplified by the amplifier to obtain an amplified voltage corresponding to the DC voltage signals, and wherein the input end of the amplifier connects to the output end of the RC wave-filter processor;

the frequency adjustment module comprises a voltage-control oscillator and a triangle-wave generator, the input end of the voltage-control oscillator connects to the output end of the amplifier such that the obtained amplified voltage passes through the voltage-control oscillator to generate an oscillated voltage signals, the input end of the triangle-wave generator connects to the output end of the voltage-control oscillator such that the generated oscillated voltage signals is modulated by the triangle-wave generator to obtain a triangle-wave signals; and the frequency output module comprises a comparator for comparing the triangle-wave signals with the predetermined reference voltage so as to obtain a new square-wave signals to be outputted to the switch transistor, the duty-cycle ratio of the square-wave signals is the same with the duty-cycle ratio of the PWM signals, the input end of the comparator connects to the output end of the triangle-wave generator, and the output end of the comparator connects to the gate of the switch transistor.

2. The circuit as claimed in claim 1, wherein the output end of the amplifier comprises a positive end and a plurality of negative ends, the positive end of the amplifier connects to the output end of the RC wave-filter processor, and the negative ends of the amplifier connects to one or more predetermined voltage output ends within the level detection module.

3. The circuit as claimed in claim 2, wherein the predetermined voltage on the negative ends of the amplifier are arranged in an increased order according to serial numbers, and a gap between the predetermined voltages are the same.

4. The circuit as claimed in claim 1, wherein the predetermined reference voltage of the input end of the comparator is the output voltage generated by a three-end regulator.

5. The circuit as claimed in claim 1, wherein the frequency output module further comprises a wave pull-up device, the input end of the wave pull-up device connects to the output end of the comparator, and the output end of the wave pull-up device connects to the gate of the switch transistor for pulling up the square-wave signals outputted from the comparator of the frequency output module, and the pulled-up square-wave signals is outputted to the switch transistor.

6. A circuit for reducing inductor magnetic-core loss, comprising:

a switch transistor, a PWM signal source connecting to a gate of the switch transistor, an inductor connecting to a drain of the switch transistor, a load connecting to a source of the switch transistor, a RC wave-filter processor, a level detection module, a frequency adjustment module and a frequency output module, wherein:

the input end of the RC wave-filter processor connects to the PWM signal source to obtain the PWM signals sent from the PWM signal source, the RC wave-filter processor performs a RC wave-filter process for the PWM signals to obtain direct current (DC) voltage signals;

the level detection module comprises an amplifier for comparing the DC voltage of the DC voltage signals with one or more predetermined voltage to obtain a comparing voltage corresponding to the DC voltage signals, the comparing voltage is amplified by the amplifier to obtain an amplified voltage corresponding to the DC voltage signals, and wherein the input end of the amplifier connects to the output end of the RC wave-filter processor;

the frequency adjustment module comprises a voltage-control oscillator and a triangle-wave generator, the input end of the voltage-control oscillator connects to the output end of the amplifier such that the obtained amplified voltage passes through the voltage-control oscillator to generate an oscillated voltage signals, the input end of the triangle-wave generator connects to the output end of the voltage-control oscillator such that the generated oscillated voltage signals is modulated by the triangle-wave generator to obtain a triangle-wave signals; and the frequency output module comprises a comparator for comparing the triangle-wave signals with the predetermined reference voltage so as to obtain a new square-wave signals to be outputted to the switch transistor, the duty-cycle ratio of the square-wave signals is the same with the duty-cycle ratio of the PWM signals, the input end of the comparator connects to the output end of the triangle-wave generator, and the output end of the comparator connects to the gate of the switch transistor;

the switch transistor being configured for obtaining the outputted square-wave signals, and for setting the frequency of the square-wave signals as the operation frequency so as to control a duration for which the current flowing through the inductor;

Wherein the output end of the amplifier comprises a positive end and a plurality of negative ends, the positive end of the amplifier connects to the output end of the RC wave-filter processor, and the negative ends of the amplifier connects to one or more predetermined voltage output ends within the level detection module; and Wherein the predetermined voltage on the negative ends of the amplifier are arranged in an increased order according to serial numbers, and a gap between the predetermined voltages are the same.

7. The circuit as claimed in claim 6, wherein the predetermined reference voltage of the input end of the comparator is the output voltage generated by a three-end regulator.

8. The circuit as claimed in claim 6, wherein the frequency output module further comprises a wave pull-up device, the input end of the wave pull-up device connects to the output end of the comparator, and the output end of the wave pull-up device connects to the gate of the switch transistor for pulling up the square-wave signals outputted from the comparator of the frequency output module, and the pulled-up square-wave signals is outputted to the switch transistor.

* * * * *